United States Patent [19]

Baker et al.

[11] Patent Number: 4,609,216
[45] Date of Patent: Sep. 2, 1986

[54] CAB DOOR STRUCTURE AND HOLD-OPEN MECHANISM

[75] Inventors: Joe L. Baker, Carman, Ill.; Thomas R. Brown, Yarmouth, Iowa

[73] Assignee: J. I. Case Company, Racine, Wis.

[21] Appl. No.: 627,089

[22] Filed: Jul. 2, 1984

[51] Int. Cl.$^4$ .............................................. E05C 17/12
[52] U.S. Cl. ............................ 292/262; 292/DIG. 49; 296/190
[58] Field of Search ................. 292/262, 48, 268, 269, 292/270, 339, 288, DIG. 49; 296/190

[56] References Cited

U.S. PATENT DOCUMENTS

| | | | |
|---|---|---|---|
| 1,128,329 | 2/1915 | Kilmer | 292/268 X |
| 1,268,986 | 6/1918 | McDowell | 292/277 |
| 3,458,226 | 7/1969 | Carlston | 292/268 |
| 4,116,483 | 9/1978 | Kramer et al. | 296/190 |
| 4,322,103 | 3/1982 | Acton | 292/262 X |
| 4,335,911 | 6/1982 | Taylor | 292/262 |

FOREIGN PATENT DOCUMENTS 27786 3/1910 United Kingdom ................ 292/268

*Primary Examiner*—Richard E. Moore

*Attorney, Agent, or Firm*—Dressler, Goldsmith, Shore, Sutker & Milnamow

[57] ABSTRACT

A door operating mechanism for a cab door of a material handling implement is disclosed which includes a hold-open latch arrangement for conveniently maintaining the door in a partially open position. The operating mechanism includes a selectively operable door latch mechanism mounted on the cab door which cooperates with a latch pin mounted on the cab frame for releasably maintaining the cab door in a closed position. The hold-open latch of the mechanism is pivotally mounted on the cab door for movement between active and inactive positions, whereby in the active position thereof the hold-open latch is releasably engageable with the frame-mounted latch pin. By this construction, the hold-open latch and latch pin can be positioned in cooperating engagement with each other whereby the cab door is maintained in a partially open position. Very effective ventilation of the operator's cab is provided when the door is in its partially open position, thus avoiding the need for relatively complex and expensive movable window assemblies or the like in the cab door construction.

4 Claims, 5 Drawing Figures

CAB DOOR STRUCTURE AND HOLD-OPEN MECHANISM

TECHNICAL FIELD

The present invention relates generally to an operating mechanism for the cab door of a material handling implement, and more particularly to a cab door operating mechanism including a hold-open latch for maintaining the cab door in a partially open position to promote ventilation of the cab area.

BACKGROUND OF THE INVENTION

To provide the necessary ventilation for the operator's cab of a material handling implement such as a tractor or the like, the one or more doors of the cab are typically provided with sliding or hingedly mounted glass window panels. While such arrangements are very commonly employed, the provision of such openable windows entails several distinct disadvantages. Because of the relatively greater number of components required in comparison to a door structure without movable windows, design and manufacture expenses are invariably relatively greater. The resultant door structure is also relatively heavy. Because the movable window panels must be easily operable, assembly and adjustment of the door are also complicated.

Accordingly, it is desirable to provide an arrangement for effecting ventilation of the cab of a material handling implement without resort to use of movable windows in the cab door. It is particularly desirable for such an arrangement to be straightforward in construction for economical manufacture and ease in service and repair, while at the same time being convenient to operate and capable of providing adequate ventilation for the comfort of the operator.

SUMMARY OF THE INVENTION

A door operating mechanism for a cab door of a material handling implement is disclosed which achieves the above desired goals in a desirably straightforward and effective manner. Not only does the mechanism permit the door to be easily opened and closed in a conventional manner, it further permits the door to be securely maintained in a partially opened disposition during operation of the implement. By this arrangement, highly effective "floor-to-ceiling" ventilation is provided to the operator, thus assuring the operator's comfort and reducing fatigue, and thereby enhancing efficiency and productivity in material handling operations.

The door operating mechanism embodying the principles of the present invention is for use on a cab door which is hingedly mounted on a frame for swinging movement between open and closed positions. The mechanism includes a selectively operable door latch mechanism which is mounted on the door. The door latch mechanism may be of a conventional configuration, and include a door striker having cooperating pincer-like jaws.

The present door operating mechanism further includes a latch pin which is mounted on the implement frame on which the door is hingedly supported. The latch pin is of a configuration such that it cooperates with the door striker of the door latch mechanism, and is releasably received by the jaws of the door striker for maintaining the door in its closed position. In the illustrated embodiment, the latch pin is shown as having a generally cylindrical configuration, with the configuration of the latch pin ordinarily selected for the desired cooperation with the door striker of the door latch mechanism.

In accordance with the present invention, the present door operating mechanism includes a hold-open latch which is mounted on the door for movement between active and inactive positions. Notably, the hold-open latch can be desirably straightforward in construction, and may be readily pivotally mounted on the door by hingedly mounting the hold-open latch on the door latch mechanism mounted on the door.

The hold-open latch is configured to cooperate with the frame-mounted latch pin for maintaining the cab door in a partially open position. To this end, the hold-open latch defines means for receiving the latch pin in the active position of the hold-open latch. By the cooperating engagement of the hold-open latch and the latch pin, the cab door is securely retained in a partially open disposition, thus providing very good ventilation for the operator of the implement.

In the preferred embodiment, the present door operating mechanism includes means for biasing the cab door toward its fully opened position. A gas biasing spring can advantageously be employed for this purpose, with this biasing action enhancing secure engagement of the hold-open latch and the latch pin.

Convenient use of the present mechanism is further promoted by the provision of over-center biasing means for the pivotally movable hold-open latch. A tension biasing spring is operatively connected to the hold-open latch for this purpose, and acts to bias the latch toward either of its active or inactive positions from a center position thereof. Thus, when use of the hold-open feature is not desired, the hold-open latch is maintained by the biasing spring in its out-of-the-way inactive position. When ventilation of the cab is desired, the hold-open latch can be easily pivoted to its active position. Although the hold-open latch can be easily manually engaged with the frame-mounted latch pin, the illustrated embodiment of the present invention is configured such that the hold-open latch automatically engages the latch pin when the latch is positioned in its active position and the cab door is opened.

Numerous other features and advantages of the present invention will become readily apparent from the following detailed description, the accompanying drawings, and the appended claims.

DETAILED DESCRIPTION

Figure 1:
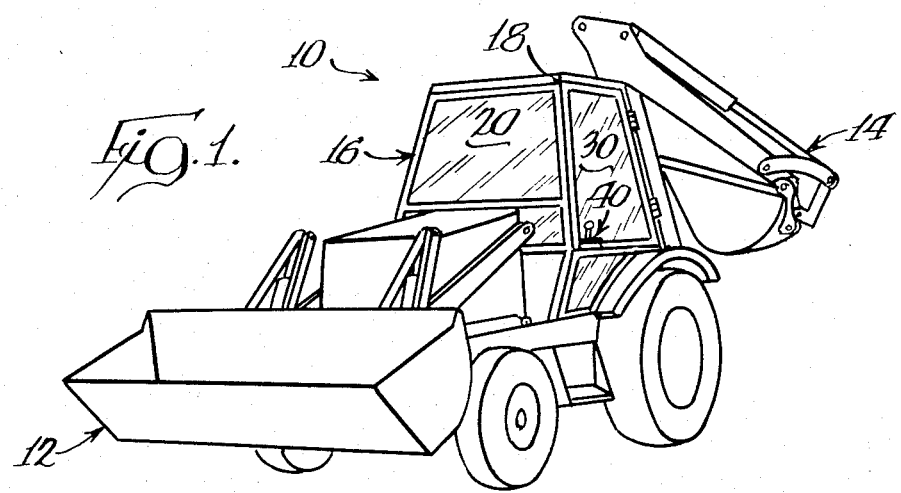
FIG. 1 is a front perspective view of a material handling implement having a cab door operating mechanism embodying the principles of the present invention.

While the present invention is susceptible of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

With reference first to FIG. 1, therein is illustrated a material handling implement 10, illustrated as a tractor, including a front end loader 12 and a backhoe 14 mounted thereon. The implement 10 includes an enclosed operator's cab 16 having a frame 18. The cab frame 18 supports a glass windshield 20, and further supports one or more cab doors 22 (one being illustrated) for providing convenient access to the cab. The present door operating mechanism is disclosed in association with the one cab door 22, with the understanding that the present operating mechanism can likewise be provided for another cab door such as 22 positioned on the opposite side of the cab.

Figure 2:
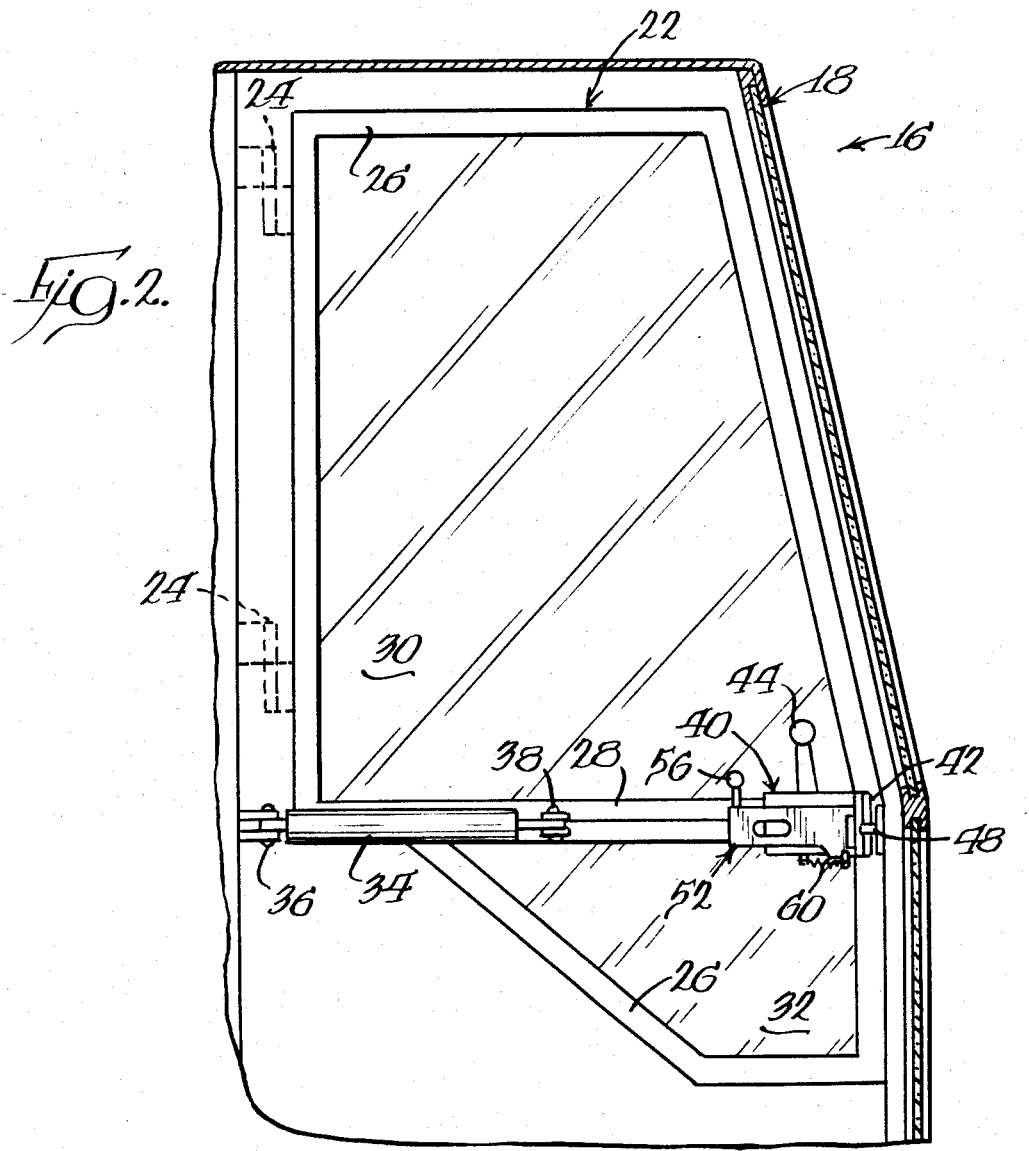
FIG. 2 is an elevational view illustrating the inside of the operator's cab of the implement shown in FIG. 1 illustrating the present door operating mechanism.

With particular reference to FIG. 2, it will be observed that the cab door 22 is hingedly mounted on the cab frame 18 by suitable hinges 24. In this manner, the door 22 can readily be moved between open and closed positions with respect to the cab frame. The door 22 itself can be desirably straightforward in construction since it need not include any movable window assemblies, and thus is illustrated as including a peripheral door frame 26 and a horizontal frame member 28 which carry and support upper and lower glass panels 30 and 32.

In keeping with the preferred embodiment of the present invention, means are provided for biasing the door 22 from its closed position toward its open position. To this end, a biasing gas spring 34 extends between and is respectively pivotally connected with the cab frame 18 at 36 and the frame member 28 at 38. Notably, the preferred relatively straightforward construction of the cab door 22 permits the door to be lighter in weight than doors which include movable window assemblies, and thus the gas spring 34 can desirably be smaller than a comparable spring arrangement for a relatively heavier door.

Figure 3:
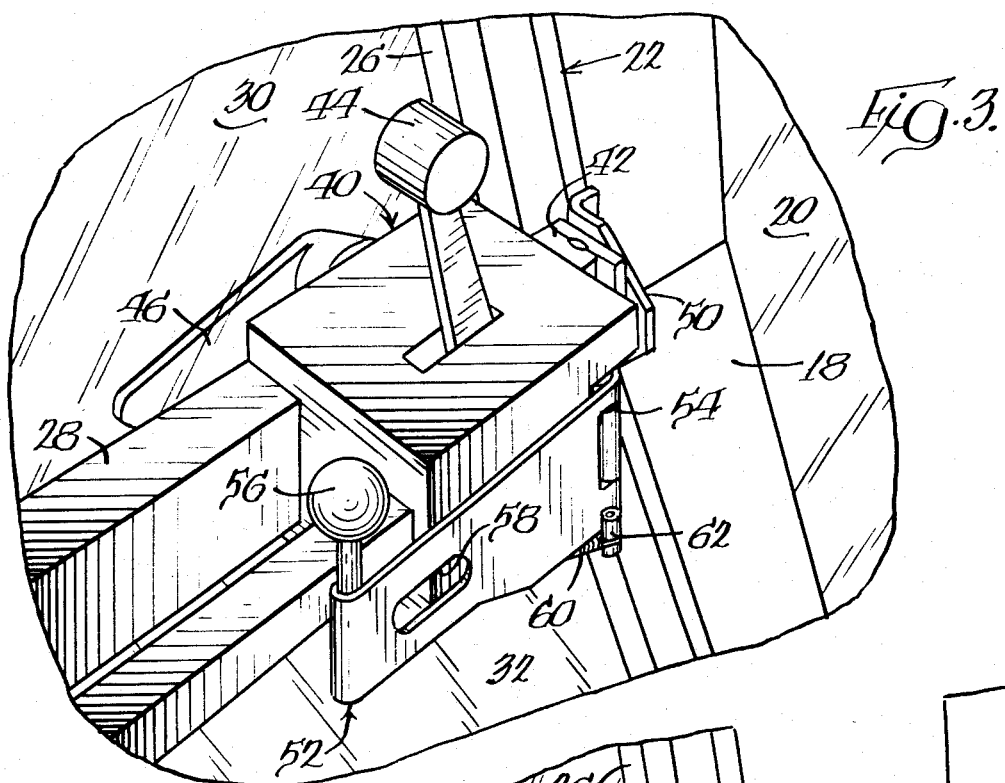
FIG. 3 is an enlarged perspective view of the inside of the cab door shown in FIG. 2 further illustrating the present door operating mechanism.
Figure 4:
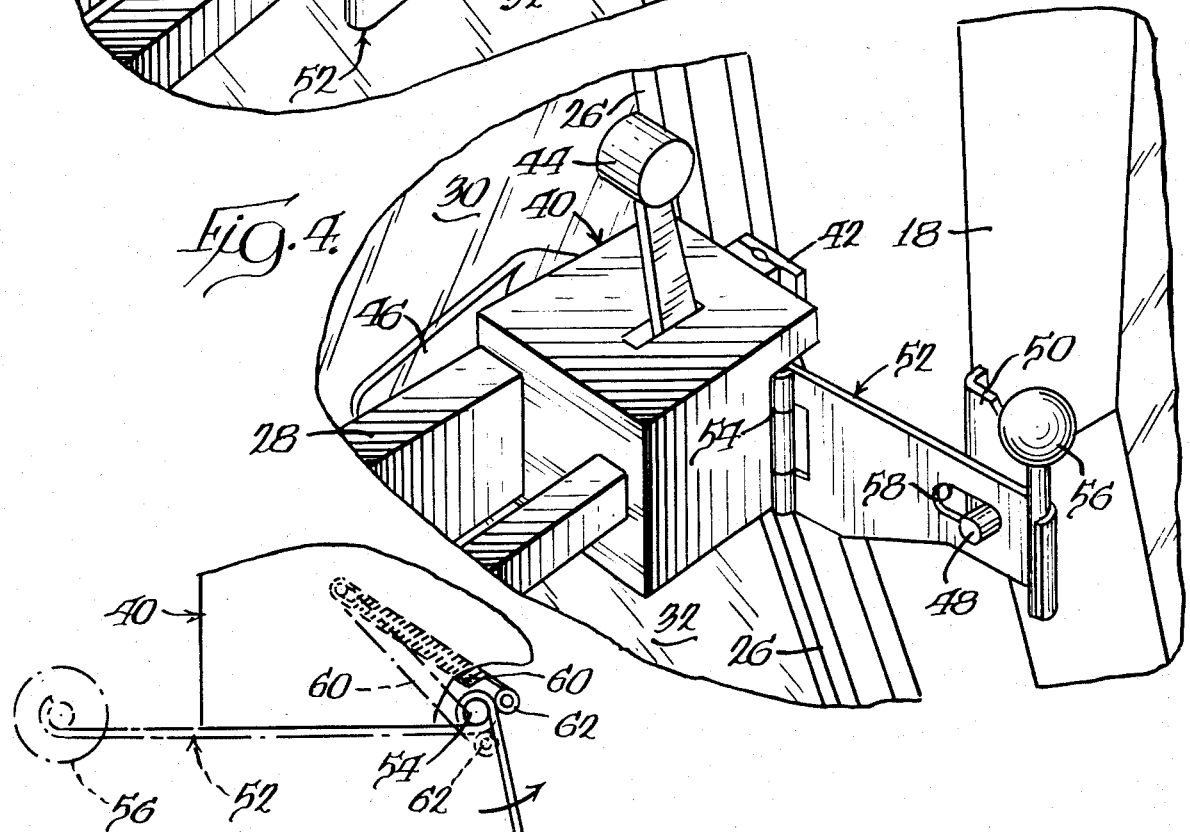
FIG. 4 is a view similar to FIG. 3 showing use of the present door operating mechanism for maintaining the associated door in a partially open position.

With particular reference to FIGS. 2 to 4, the present door operating mechanism comprises a door latch mechanism 40 which is preferably mounted on the cab door 22. In many respects, the door latch mechanism 40 can be of a conventional construction, and include a door striker 42 having cooperating pincer-like jaws as is known in the art. An inner door handle 44 permits release of the door striker 42 for effecting opening of the door, with an outer door handle 46 likewise provided for this purpose.

In order to maintain the door 22 in its closed position relative to cab frame 18, a latch pin 48 is provided on the cab frame 18, and is mounted thereon by way of latch bracket 50. The latch pin 48 is illustrated as having a generally cylindrical configuration, and as will be recognized by those familiar with the art, is configured for releasable engagement with the door striker 42 of the door latch mechanism 40. Thus, the latch pin 48 is received by the door striker 42 for maintaining door 22 in its closed position, with operation of either inner or outer handle 44 or 46 acting to open the door striker 42 for release of the latch pin 48, whereupon gas spring 34 urges the door 22 toward its open position.

In accordance with the present invention, the present door operating mechanism includes a hold-open latch 52 which is movably mounted on the door 22. The desired movable mounting of the hold-open latch 52 on the door 22 is preferably effected by way of hingedly mounting the hold-open latch for pivotal movement on the door latch mechanism 40 at hinge 54. In this manner, the hold-open latch 52 is mounted for pivotal movement between an inactive position (shown in FIG. 3) and an active position (shown in FIG. 4). Manual movement of the hold-open latch 52 between its active and inactive positions is facilitated by the provision of latch handle 56.

Hold-open latch 52 is configured for cooperation with latch pin 48 in order to maintain cab door 22 in a partially opened position, as shown in FIG. 4. Accordingly, the hold-open latch 52 defines a pin-receiving opening 58 for receiving the latch pin 48 therein. Notably, the biasing action of gas spring 34 on the cab door 22 acts to maintain the releasable engagement of the hold-open latch 52 with the latch pin 48. As will be observed, the partially open disposition of cab door 22 provides very effective ventilation for the operator's cab 16, and in essence, provides "floor-to-ceiling" air flow. Additionally, it will be noted that the preferred hinged mounting of the cab door 22 at its rearward edge (referring to the orientation of forward travel of the implement 10) promotes highly effective ventilation in the cab area when the implement 10 is being driven. Although only a single one of the doors 22 has been shown, many material handling implements include doors at opposite sides of the cab area. Thus, by equipping both of the doors with a door operating mechanism and hold-open latch in accordance with the present invention, very effective cross-ventilation is provided for the operator.

Figure 5:
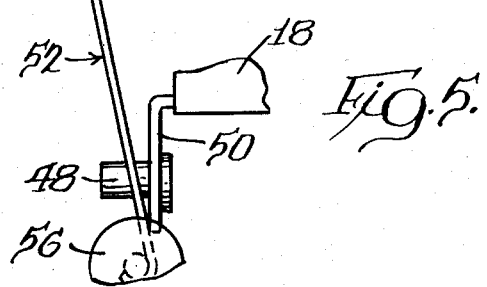
FIG. 5 is a top plan view, in partial cutaway, of the present door operating mechanism illustrating the active and inactive positions of the hold-open latch of the mechanism.

To promote convenient use of the hold-open latch 52, over-center biasing means are preferably provided for biasing the hold-open latch toward either of its active and inactive positions from a center position thereof. This preferred over-center biasing action is provided by an over-center tension biasing spring 60 in the illustrated embodiment. One end of biasing spring 60 can be readily anchored to the door latch mechanism 40, with the other end of the spring connected to the hold-open latch 52 by way of an offset pin 62. By this construction, the hold-open latch 52 is maintained in its out-of-the-way inactive disposition (shown in phantom line in FIG. 5) when its use is not required. The hold-open latch 52 can easily be moved with the handle 56 through its center position from its inactive position, whereupon biasing spring 60 urges the hold-open latch toward its active position.

Notably, the provision of the over-center spring 60, together with the generally vertically aligned disposition of the hold-open latch with respect to latch pin 48, desirably provides an automatic or "self-engaging" action for the hold-open latch with the latch pin. When cab door 22 is in its closed position, the operator may merely pivot the hold-open latch 52 to its active position, in which it is maintained by biasing spring 60. The cab door 22 can then be opened by operation of door latch mechanism 40, with gas spring 34 urging the door outwardly. During this action, latch pin 48 is released from door striker 42, with hold-open latch 52 urged generally toward and against latch pin 48 by biasing spring 60. As cab door 22 moves to its partially open position, the latch pin 48 is received within the pin-receiving opening 58 of the hold-open latch, with the biasing action of spring 60 as well as gas spring 34 urging the hold-open latch 52 and the latch pin 48 into engagement with each other. Disengagement of the hold-open latch 52 and the latch pin 48 is very easily effected merely by moving the hold-open latch 52 toward its inactive position by manipulation of handle 56. With the hold-open latch 52 in its inactive position, door latch mechanism 40 can be operated in a conventional manner for opening and closing the cab door 22.

From the foregoing, it will be observed that numerous modifications and variations can be effected without departing from the true spirit and scope of the novel concept of the present invention. It is to be understood that no limitation with respect to the specific embodiment shown is intended or should be inferred. It is, of course, intended to cover by the appended claims, all such modifications as fall within the scope of the claims.

What is claimed is:

1. A door structure and hold-open mechanism for a material handling implement, comprising:
   a door frame for mounting on said implement;
   a cab door having hinge means hingedly mounting the door on said frame for swinging movement of the door between open and closed positions with respect to said frame;
   hold-open latch means having pivotal mounting means for pivotally mounting the latch means on said door for manual movement of the latch means between active and inactive positions with respect to said door;
   latch pin means fixedly mounted on said frame in a position for engagement with said hold-open latch means in the active position thereof for maintaining said door in a partially opened position between said open position and said closed position;
   said hold-open latch means defining an opening positioned for receiving and engaging said latch pin means only when said hold-open latch means is in said active position and said door is in said partially opened position for maintaining said door in said partially opened position, said hold-open latch means being movable out of engagement with said latch pin means when said door is in said partially opened position;
   door spring biasing means operatively connected to said door and said frame for moving and biasing said door outwardly from said closed position toward said open position; and
   latch biasing means operatively connected to said latch means and said door for biasing said hold-open latch means toward said active position whereby said hold-open latch means is positionable in said active position when said door is in said closed position without disposition of said latch pin means in said opening, whereupon said hold-open latch means automatically receives said latch pin means in said opening when said door is moved by said door spring biasing means from said closed position toward said opened position, said door spring biasing means and said latch biasing means cooperating to maintain said latch pin means in engagement with said hold-open latch means.

2. A cab door hold-open mechanism in accordance with claim 1, wherein
   said latch biasing means comprises over-center biasing means for biasing said hold-open latch means toward either of said active and inactive positions from a center position thereof.

3. A cab door hold-open mechanism in accordance with claim 1, wherein said door spring biasing means comprises gas spring means.

4. A cab door hold-open mechanism in accordance with claim 3, wherein,
   said hold-open latch means includes handle means to facilitate manual movement thereof between said active and inactive positions.

* * * * *